United States Patent
Fukuda

(10) Patent No.: US 8,209,552 B2
(45) Date of Patent: Jun. 26, 2012

(54) METHOD AND DEVICE FOR CONTROLLING MULTICORE PROCESSOR

(75) Inventor: Masahiro Fukuda, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 610 days.

(21) Appl. No.: 12/184,922

(22) Filed: Aug. 1, 2008

(65) Prior Publication Data

US 2009/0094437 A1  Apr. 9, 2009

(30) Foreign Application Priority Data

Oct. 7, 2007 (JP) ................................. 2007-262792

(51) Int. Cl.
  *G06F 1/00* (2006.01)
  *G06F 1/26* (2006.01)
  *G06F 1/32* (2006.01)
(52) U.S. Cl. .................. 713/300; 713/320; 713/324
(58) Field of Classification Search .................. 713/300, 713/320–324
  See application file for complete search history.

(56) References Cited

U.S. PATENT DOCUMENTS

| | | | |
|---|---|---|---|
| 6,496,823 B2 * | 12/2002 | Blank et al. ............... | 1/1 |
| 6,622,287 B1 * | 9/2003 | Henkel ....................... | 716/105 |
| 6,711,691 B1 * | 3/2004 | Howard et al. ............ | 713/300 |
| 7,013,400 B2 * | 3/2006 | Kalla et al. ................ | 713/320 |
| 7,146,514 B2 * | 12/2006 | Kaushik et al. ............ | 713/322 |
| 7,174,469 B2 * | 2/2007 | Luick ......................... | 713/300 |
| 7,337,334 B2 * | 2/2008 | Kuhlmann et al. ........ | 713/300 |
| 7,386,739 B2 * | 6/2008 | Ghiasi et al. .............. | 713/300 |
| 7,421,691 B1 * | 9/2008 | Hancock et al. ........... | 718/100 |
| 7,694,009 B2 * | 4/2010 | Shah et al. ................. | 709/235 |
| 7,761,548 B2 * | 7/2010 | Snyder et al. .............. | 709/223 |
| 7,865,084 B2 * | 1/2011 | Krishnamoorthy et al. .. | 398/164 |
| 7,917,785 B2 * | 3/2011 | Jacobowitz et al. ........ | 713/320 |
| 2002/0198924 A1 * | 12/2002 | Akashi et al. ................. | 709/102 |

(Continued)

FOREIGN PATENT DOCUMENTS

EP   1933305 A1 * 6/2008

(Continued)

OTHER PUBLICATIONS

Ribando, R.J.; Skadron, K.; , "Many-core design from a thermal perspective," Design Automation Conference, 2008. DAC 2008. 45th ACM/IEEE , pp. 746-749, Jun. 8-13, 2008.*

(Continued)

*Primary Examiner* — Faisal M Zaman

(74) *Attorney, Agent, or Firm* — Brinks Hofer Gilson & Lione

(57) ABSTRACT

The present invention provides a method and a device for controlling a multicore processor by selecting and operating the appropriate number of cores corresponding to an operation state of the processor. In a multicore processor having a plurality of cores each independently performing a calculation process on one processor, an operating rate of a thread or task of each core within a predetermined time is calculated by summing the operating times or the number of operating times within a predetermined time, and an overall operating rate of all the cores is found by summing the calculated operating rates. The number of operating cores corresponding to the overall operating rate is determined by a previously set table. The number of cores operating has a hysteresis characteristic in which the number of operating cores is different between increasing and decreasing times of the overall operating rate. Operating cores corresponding to the number of the determined cores are selected by the previously set table. When an exceptional process is detected, all the cores operate. After a predetermined time, when it is determined that the exceptional process is eliminated, the process returns to the original processing.

18 Claims, 5 Drawing Sheets

U.S. PATENT DOCUMENTS

| | | | | |
|---|---|---|---|---|
| 2003/0115495 A1* | 6/2003 | Rawson, III | ............... | 713/324 |
| 2005/0154931 A1* | 7/2005 | Oh | ............... | 713/300 |
| 2007/0021942 A1* | 1/2007 | Sato et al. | ............... | 702/182 |
| 2007/0094375 A1* | 4/2007 | Snyder et al. | ............... | 709/223 |
| 2007/0156370 A1* | 7/2007 | White et al. | ............... | 702/132 |
| 2007/0240003 A1* | 10/2007 | Watts, Jr. | ............... | 713/322 |
| 2009/0089562 A1* | 4/2009 | Schuchman et al. | ............... | 712/228 |
| 2009/0327656 A1* | 12/2009 | Baum et al. | ............... | 712/43 |
| 2010/0218170 A1* | 8/2010 | MacLellan et al. | ............... | 717/127 |
| 2011/0047401 A1* | 2/2011 | Werner | ............... | 713/500 |

FOREIGN PATENT DOCUMENTS

| | | | |
|---|---|---|---|
| JP | 62274451 A | * | 11/1987 |
| JP | 03127164 A | * | 5/1991 |
| JP | 04153864 A | * | 5/1992 |
| JP | 04223548 A | * | 8/1992 |
| JP | 06187301 A | * | 7/1994 |
| JP | 11-202988 | | 7/1999 |
| JP | 2008129846 A | * | 6/2008 |

OTHER PUBLICATIONS

Sengupta, D.; Saleh, R.A.; , "Application-Driven Voltage-Island Partitioning for Low-Power System-on-Chip Design," Computer-Aided Design of Integrated Circuits and Systems, IEEE Transactions on , vol. 28, No. 3, pp. 316-326, Mar. 2009.*

Musoll, E.; , "Hardware-Based Load Balancing for Massive Multicore Architectures Implementing Power Gating," Computer-Aided Design of Integrated Circuits and Systems, IEEE Transactions on , vol. 29, No. 3, pp. 493-497, Mar. 2010.*

Curtis-Maury, M.; Blagojevic, F.; Antonopoulos, C.D.; Nikolopoulos, D.S.; , "Prediction-Based Power-Performance Adaptation of Multithreaded Scientific Codes," Parallel and Distributed Systems, IEEE Transactions on , vol. 19, No. 10, pp. 1396-1410, Oct. 2008.*

* cited by examiner

OPERATING RATE OF EACH CORE ($\eta$)

CORE0: $\eta 0 = (T1+T2+T3)/T \times 100$

CORE1: $\eta 1 = (T4)/T \times 100$

CORE2: $\eta 2 = (T5+T6)/T \times 100$

CORE3: $\eta 3 = (T7+T8)/T \times 100$

OVERALL OPERATING RATE $\eta$ $\eta = (\eta 0 + \eta 1 + \eta 2 + \eta 3)$ ··· 400% AT MAXIMUM

FIG.5

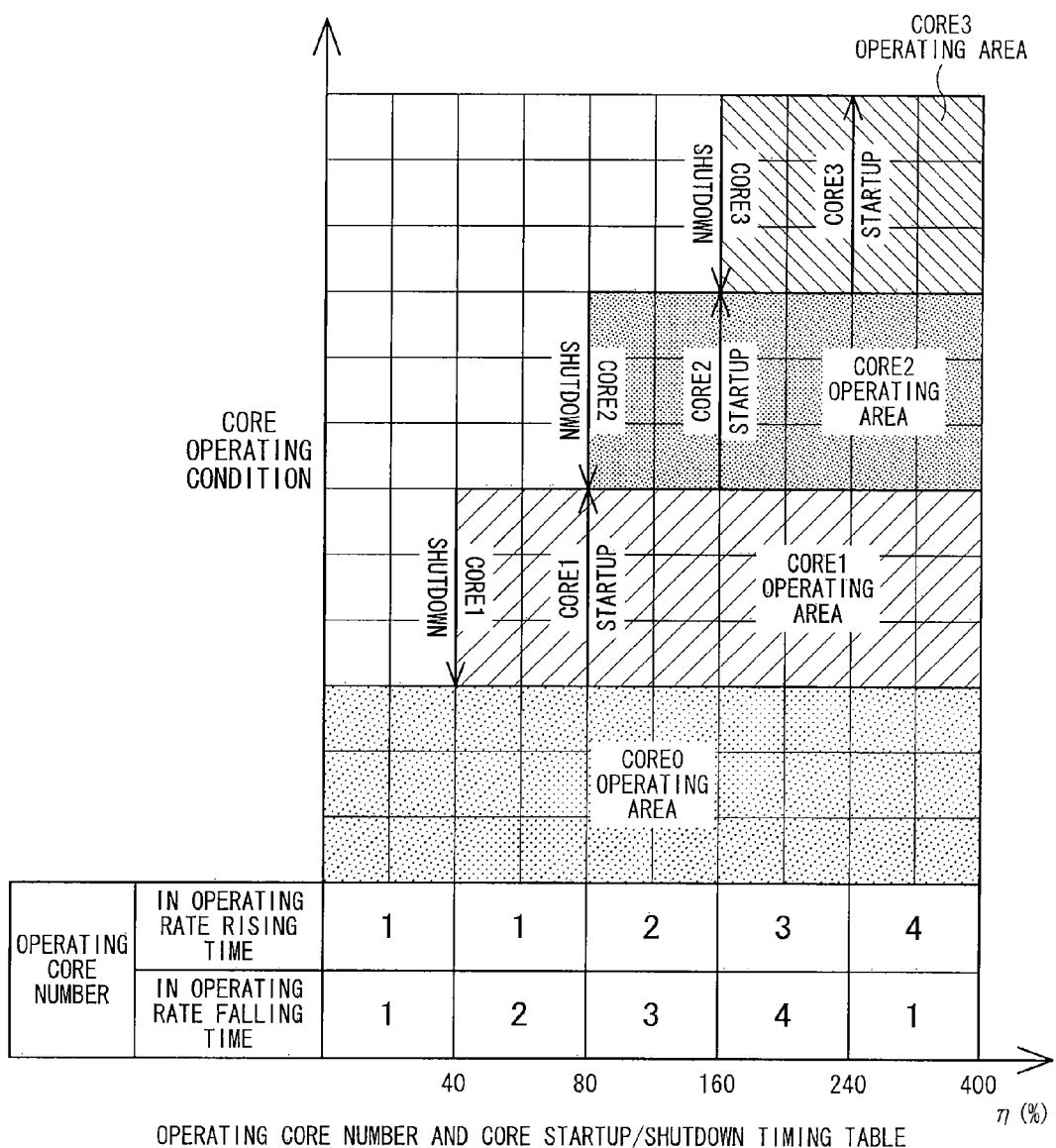

OPERATING CORE NUMBER AND CORE STARTUP/SHUTDOWN TIMING TABLE

STARTUP OF CORE
    IF OVERALL OPERATING RATE $\eta \leq 40\%$, ONLY CORE0 OPERATES
    IF OVERALL OPERATING RATE $\eta > 80\%$, CORE1 STARTS UP
    IF OVERALL OPERATING RATE $\eta > 160\%$, CORE2 STARTS UP
    IF OVERALL OPERATING RATE $\eta > 240\%$, CORE3 STARTS UP SHUTDOWN OF CORE
    e.g. IF OVERALL OPERATING RATE $\eta \leq 160\%$, CORE2 IS SHUT DOWN

METHOD AND DEVICE FOR CONTROLLING MULTICORE PROCESSOR

RELATED APPLICATIONS

The present application claims priority to Japanese Patent Application Number 2007-262792, filed Oct. 7, 2007, the entirety of which is hereby incorporated by reference.

BACKGROUND

1. Field of the Invention

The present invention relates to a method for reducing the power consumption of a device including a processor having a multicore configuration and a device for performing the method.

2. Description of Related Art

A conventional general microprocessor incorporates one processor core operating as one component, in which a command issuing section and an operation section are combined in a package. In order to improve performance using such a single processor, a CPU overclock method for increasing clock frequency has been used. However, power consumption increases and heat generation associated with the CPU overclock method becomes a restriction and, therefore, development of another method is needed.

To address the above-described problems, a multiprocessor technique has been developed and widely used such that a plurality of processors are connected so as to operate in parallel with each other and are able to perform an effective process. However, the multiprocessor has the following problem. When a plurality of processors are simply connected together so as to operate in parallel with each other, the multiprocessor becomes large due to the number of processors and, therefore, the utility of the multiprocessor is limited. In an alternative approach, with the recent advance of high-density LSI fabrication techniques, a multicore processor has been developed and widely used in which a plurality of processor cores capable of operating independently from each other are provided on one processor.

In the multicore processor, processor cores can operate independently because of their basically independent configuration. The principle of the multicore processor is almost the same as that of the multiprocessor. A process can be shared among a plurality of processor cores for performance improvement. In other words, an increase in the number of cores provided in the multicore processor leads to higher performance.

For that reason, the number of cores in the muticore processor has eventually increased from a dual-core processor with two cores up to a quad-core processor with four cores. Such a multicore processor is widely known as a user-friendly processor for the following reason. That is, the usability of the multicore processor is little different from that of a multiprocessor configuration, which leads to reliable operation, and it is treated as a plurality of microprocessors by the operating system (OS).

In Japanese Patent Application Publication No. H 11-202988, a technique is disclosed for monitoring the level of use of the respective processors to identify and then stop or suspend a processor which is small in usage, when a multiprocessor system including a plurality of processors does not require a large processing capacity.

In a multicore processor as described above, a plurality of cores are integrated in one processor, and the processor is compact in overall size. Further, the processor is easy to use and has become more inexpensive. High demand for the processor is now expected in small electronic devices. However, when using this high-performance multicore processor, for example, the quad-core processor in which the multicore processor has four cores in one processor, the four cores are not always necessary.

Specifically, for higher performance of a specific electronic device, a high throughput is needed only for a short time in performing a specific function. In the case of mounting a quad-core processor with four cores in a device, when the specific function for performing a large amount of processing is operated, the four cores are in full operation so as to perform the desired function. However, this high-speed process is not required when performing functions other than the specific function.

In the conventional multicore processor, even when the processor has no task to be processed at the moment or does not perform a thread process in one task, the processor always stands ready to perform some processing, which leads to electric power consumption. This useless power consumption is a problem in a general household appliance. Particularly, a large burden exists for a number of devices receiving power from a battery such as a mobile device or lighting devices and on-vehicle devices, and a solution is required. Further, heating increases along with high power consumption, and measures for restricting heat generation and protective measures against generated heat are also required, which increase cost.

In Japanese Patent Application Publication No. H11-202988 cited as related art, the technique merely restricts the operation of a specific processor and does not perform an effective operational control of the entire multiprocessor.

SUMMARY OF THE INVENTION

Accordingly, in a multicore processor having a plurality of processor cores each independently performing a calculation process, when the entire calculation processing amount of the processor is small, it is desirable to operate the appropriate number of cores efficiently. As a result, it is a main object of the present invention to provide a method for controlling a multicore processor and a device for performing the method, capable of reducing power consumption, suppressing heat generation, and improving cost efficiency for heat generation preventive measures and protective measures against generated heat.

To accomplish the above-described objects, according to one embodiment of the present invention, there is provided a method for controlling a multicore processor having a plurality of cores each independently performing a calculation process on one processor. The method comprises the acts of: calculating an operating rate of each core within a predetermined time to sum the operating rates of all the cores for calculating an overall operating rate; determining the number of cores to be operated corresponding to the overall operating rate of the cores; and selecting cores to be operated corresponding to the determined number of cores.

According to another aspect of the method, the operating rate of each core is a rate of an operating time within a predetermined time, and the operating time of each core is summed to calculate the overall operating rate of the cores.

According to yet another aspect of the method, the operating rate of each core is a rate of the number of operating times within a predetermined time, and the number of operating times of each core is summed to calculate the overall operating rate of the cores.

According to yet another aspect of the method, a calculation of the operating rate of each core is performed on a thread or task performed in each core.

According to yet another aspect of the method, the process according to the method is performed in a specific core of the plurality of cores.

According to yet another aspect of the method, in selecting the operating cores, an operating core selecting section differentiates the number of operating cores between increasing and decreasing times of the overall operating rate in accordance with a hysteresis characteristic.

According to yet another aspect of the method, in selecting the plurality of cores, predetermined specific cores corresponding to the overall operating rate are selected.

According to yet another aspect of the method, of the present invention, in selecting the plurality of cores, specific cores are changed by a predetermined method corresponding to the overall operating rate.

According to yet another aspect of the method, in selecting the operating cores, specific cores are randomly selected.

According to yet another aspect of the method, in selecting the plurality of cores, when an exceptional process is detected, all the cores are selected.

According to yet another aspect of the method, after selecting all the cores, when detecting that the exceptional process is eliminated after an elapse of a predetermined time, the selection process of the cores is resumed.

According to yet another aspect of the method, the exceptional process is detected when an operation of the method for controlling a multicore processor described above is not appropriately performed.

To accomplish the above-described objects, according to one embodiment of the present invention, there is provided a device for controlling a multicore processor having a plurality of cores each independently performing a calculation process on one processor. The device comprises: a core operating rate calculating section for calculating an operating rate of each core within a predetermined time; an overall operating rate calculating section for summing the operating rate of each core calculated by the core operating rate calculating section to calculate an operating rate of the entire processor; an operating core number storing section for storing in association the overall operating rate of the processor and the number of operating cores; an operating core number determining section for determining the number of operating cores based on the overall operating rate of the processor in the operating core number storing section; and an operating core selecting section for selecting operating cores corresponding to the number of cores determined by the operating core number determining section.

According to another aspect of the device, the core operating rate calculating section calculates a core operating rate of each core based on an operating time within a predetermined time, and the overall operating rate calculating section sums the operating time of each core to calculate the overall operating rate.

According to yet another aspect of the device, the core operating rate calculating section sums the number of operating times within a predetermined time to calculate the overall operating rate, and the overall operating rate calculating section sums the number of operating times of each core to calculate the overall operating rate.

According to yet another aspect of the device, the core operating rate calculating section performs a calculation of the operating rate on a thread or task performed in each core.

According to yet another aspect of the device, the calculating section, the storing section, the determining section, and the selecting section are provided on a specific core of the plurality of cores.

According to yet another aspect of the device, the operating core selecting section differentiates the number of operating cores between increasing and decreasing times of the overall operating rate in accordance with a hysteresis characteristic.

According to yet another aspect of the device, the operating core selecting section selects a predetermined specific core corresponding to the overall operating rate.

According to yet another aspect of the device, the device further comprises: an exceptional process generation detecting section for detecting the generation of an exceptional process in the multicore processor, wherein the operating core number determining section determines the operation of all the cores when the exceptional process generation detecting section detects the generation of the exceptional process.

In a multicore processor as configured above with a plurality of processor cores each independently performing a computation process, when the overall calculation processing amount of the processor is small, the appropriate number of cores operate efficiently. As a result, there is provided a method for controlling a multicore processor and a device for performing the method, capable of reducing power consumption, suppressing heat generation, and improving cost efficiency for heat generation preventive measures and protective measures against generated heat.

BRIEF DESCRIPTION OF THE DRAWINGS

FIG. 5 is an example of a table for selecting an operating core when determining the number of operating cores.

DETAILED DESCRIPTION OF THE PREFERRED EMBODIMENTS

It is an object of the present invention to operate only the appropriate number of cores in conformity to an operating state of a multicore processor. Preferred embodiments of the present invention will be described below with reference to the accompanying drawings.

Figure 1:
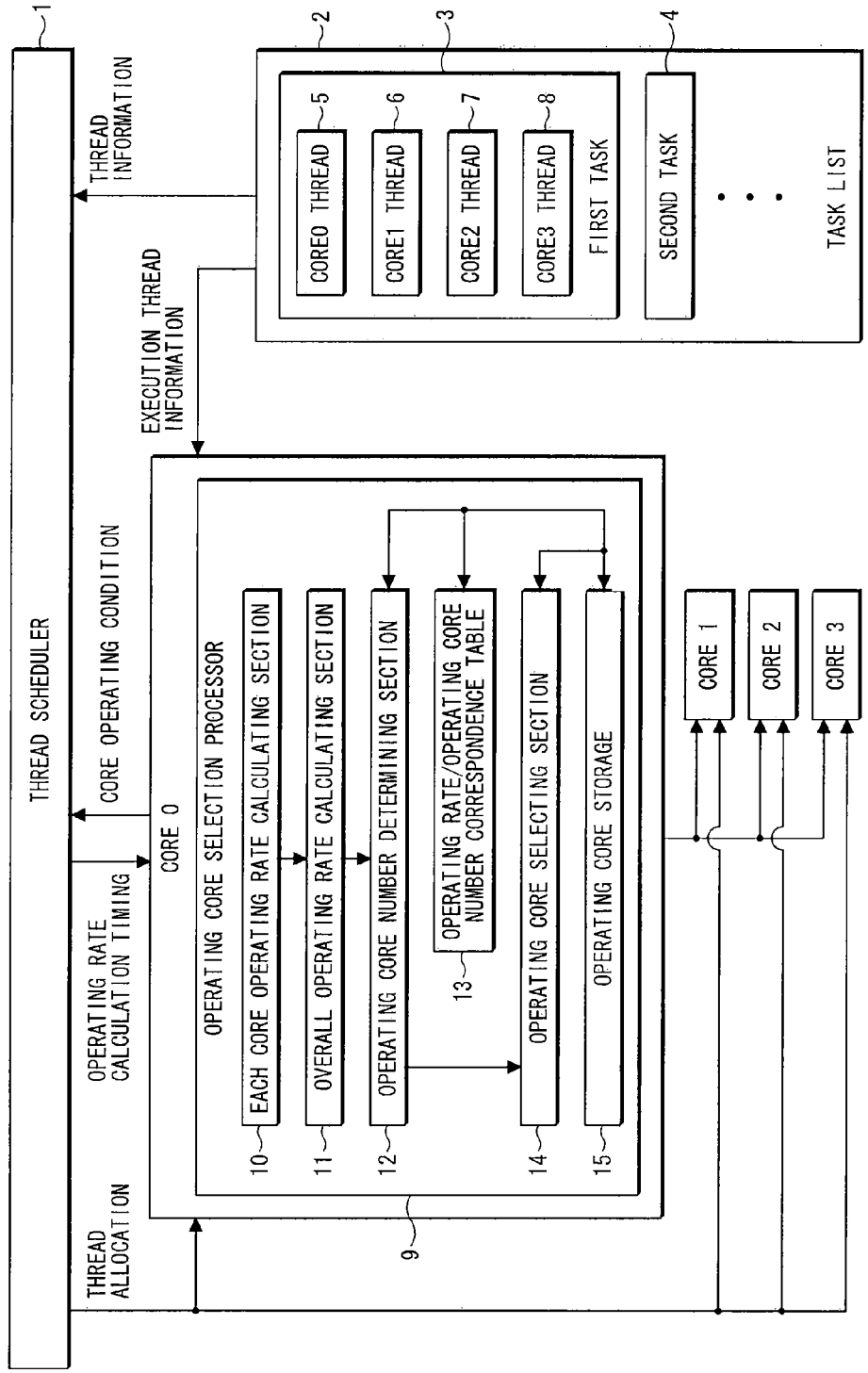
FIG. 1 is a functional block diagram according to an embodiment of the invention.

FIG. 1 is a functional block diagram of one embodiment of a multicore processor according to the present invention and shows an example of one processor having four cores (Cores 0 to 3). In the example shown, one task is divided into a number of threads, and for increasing the processing speed, each of the threads performs a process allocated to each core by a thread scheduler 1.

Thus, in the example of FIG. 1, a number of tasks such as a first task 3, a second task 4 and the like are listed in a task list 2. For example, a number of threads exist in the first task 3, and these threads are processed by the cores 0 to 3 according to an instruction of the thread scheduler 1. The thread scheduler 1 performs an allocation process of threads based on thread information of the task list.

Accordingly, with respect to the first task 3, a core0 thread 5 is a thread to be processed in the core0, a core1 thread 6 is a thread to be processed in the core1, a core2 thread 7 is a thread to be processed in the core2, and a core3 thread 8 is a thread to be processed in the core3. When performing a process of one task, the core0 thread 5 is processed in the core0 from the first task 3 shown in the task list 2. In the same manner, the core1 thread 6 is processed in the core1, the core2 thread 7 is processed in the core2, and the core3 thread 8 is processed in the core3. In this way, one task is divided into a number of threads and parallelized by the four cores in FIG. 1. As a result, a desired process can be performed in a multicore processor.

In such a multicore processor, among the four cores 0 to 3, one previously-set core is used as a basic core for an operational control core. An example of using the core0 as this basic core is shown in the Figure. This core0 includes an operating core selection processor 9 for selecting an operating core among the cores 0 to 3. A process performed in this operating core selection processor 9 will be described in detail below with reference to FIGS. 2 to 5. In FIG. 1, there is shown an example in which the operating core selection processor 9 includes an each core operating rate calculating section 10 for calculating an operating rate for each core, an overall operating rate calculating section 11 for calculating the overall operating rate based on the calculation result of the each core operating rate calculating section, an operating core number determining section 12 for reading out data from an operating rate/operating core number correspondence table 13 to determine the number of operating cores using the number of operating cores in the preceding process stored in an operating core storage 15 based on the calculation result of the overall operating rate calculating section, and an operating core selecting section 14 for selecting the operating core based on both the number of operating cores determined by the operating core number determining section and the preceding data of the operating cores.

Figure 2:
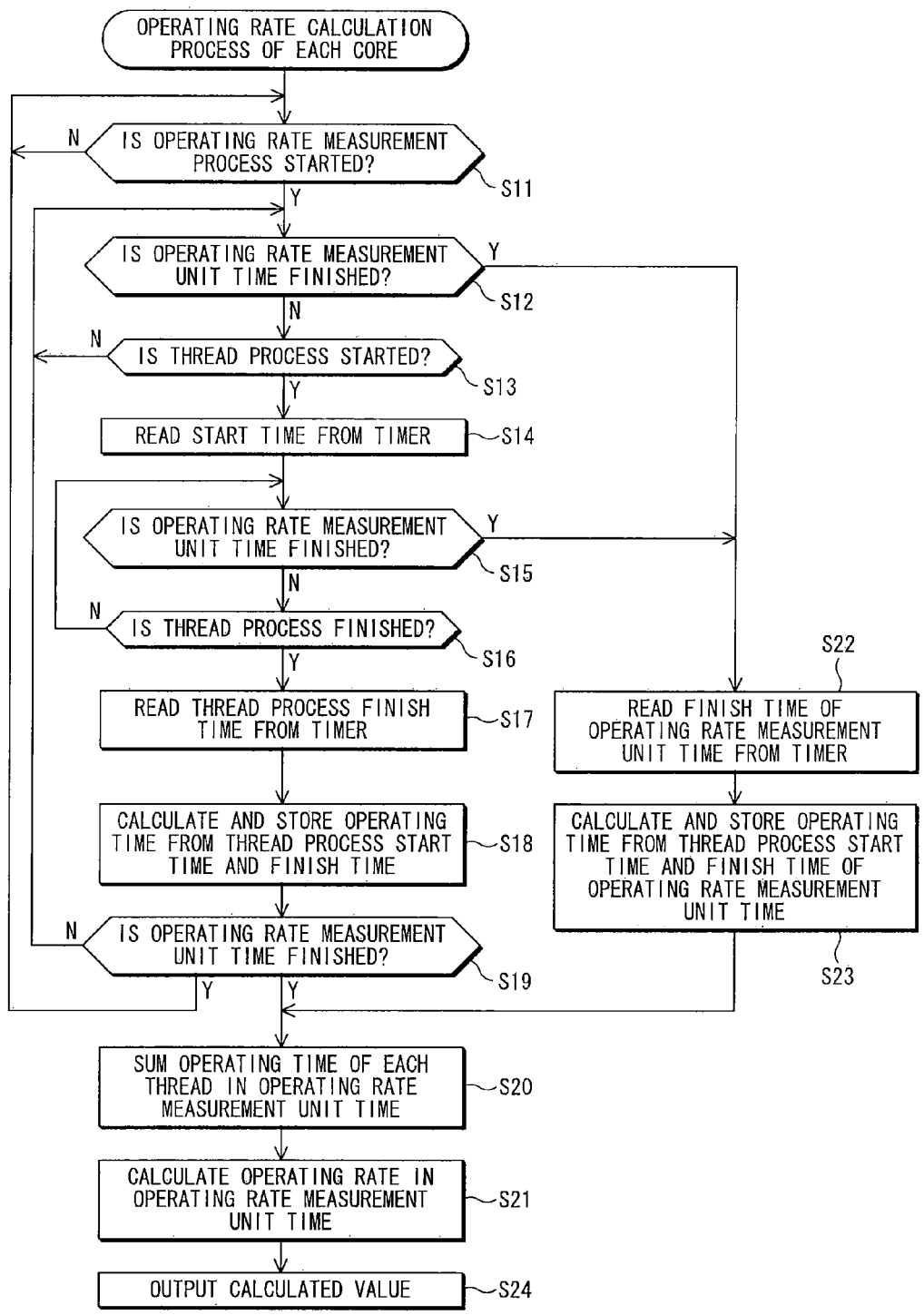
FIG. 2 is a flow diagram of an operating rate calculation process for each core according to the embodiment.
Figure 3:
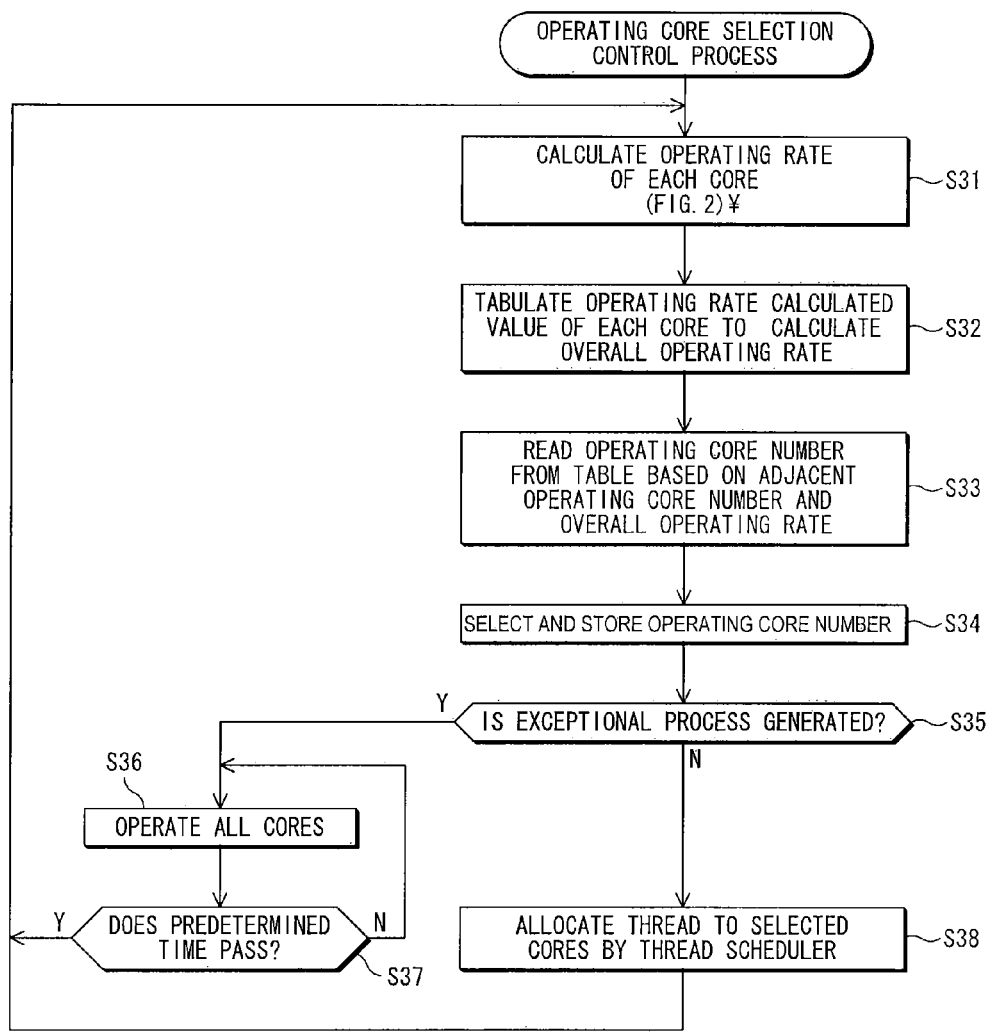
FIG. 3 is a flow diagram of an operating core selection control process according to the embodiment.

The multicore processor including the above-described functional blocks may operate according to an operation flow as shown in FIGS. 2 and 3. FIG. 2 shows an operation flow of the operating rate calculation process for each core used for the control of the present embodiment. In the example, as a process for each core, it is first determined whether the operating rate measurement process starts (step S11).

Figure 4:
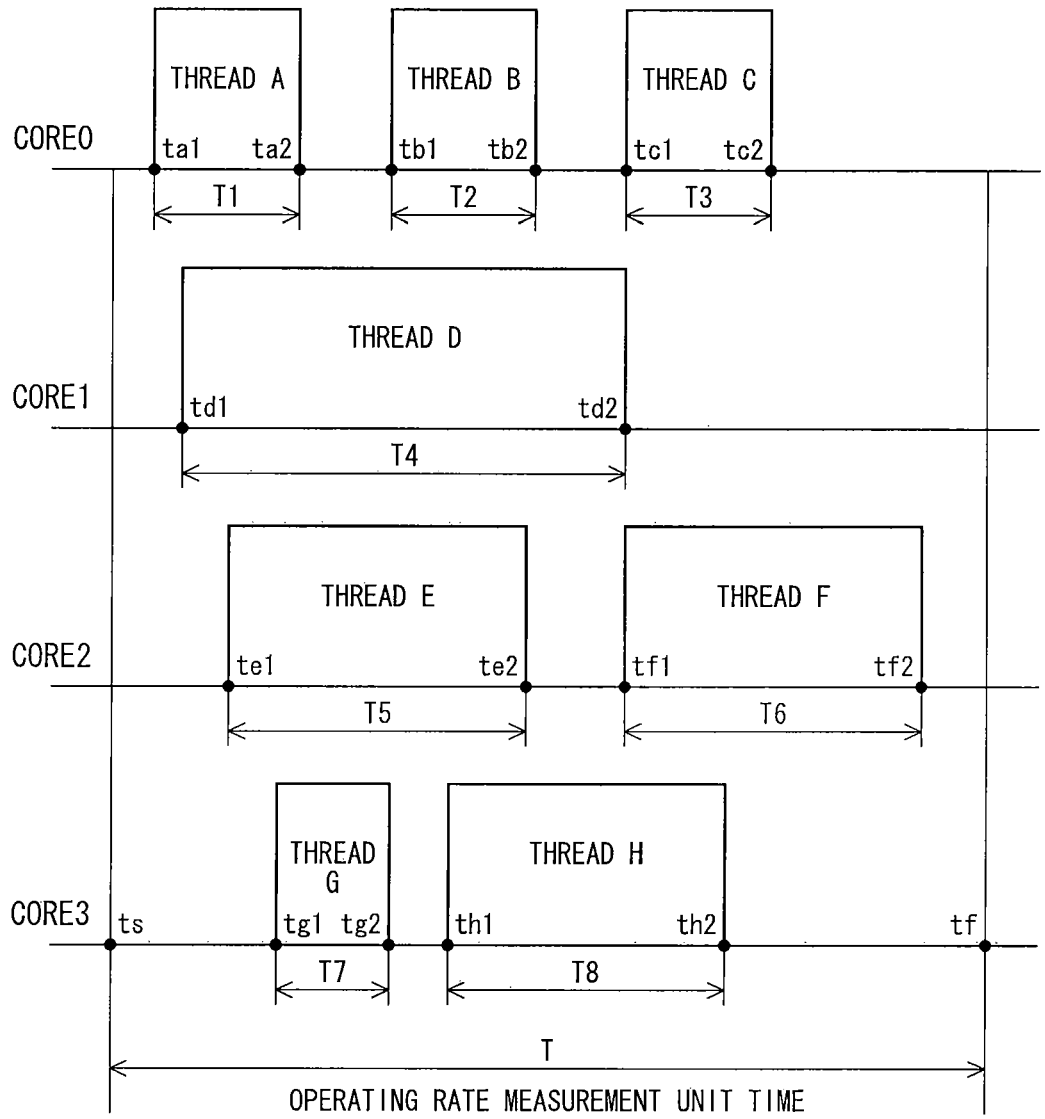
FIG. 4 illustrates an operating rate calculation example for each core.

For example, as shown in FIG. 4, in measuring the operating rate for each core, a time for which each core operates during a predetermined time T is measured. Specifically, ts is set as the start time for a measurement process and tf is set as the end time for the measurement process in order to measure the operating rate of each core during a predetermined time T indicated as the difference (ts−tf) in the drawing. Accordingly, it is determined whether it is the time ts in step S11 of the operation flow of FIG. 2. In the actual process, using software previously stored, for example, in the core0, the process may be performed without detecting the time, by performing a processing start instruction and a processing end instruction.

In the example of FIG. 2, the processing start instruction is issued as described above in step S11 and when it is determined that the operating rate measurement process starts, to confirm the end of the operating rate measurement unit time before performing the next process, it is determined whether the operating rate measurement unit time ends (step S12). When the above-described time ends, the process proceeds to step S22, whereas if the time does not end, the process proceeds to step S13. When the start instruction for the operating rate measurement process is not yet issued in step S11, the process waits in this state. In the example of FIG. 4, in the core0, a process of the thread A starts after the start time ts for the operating rate measurement process. If the process of this thread A does not start yet in step S13, the process returns to step S12. If the operating rate measurement unit time has not ended, the process waits while repeating this operation.

If it is determined that the operating rate measurement process starts in step S11, and it is determined that the operating rate measurement unit time does not end in step S12, it is immediately determined whether the thread process starts in step S13. The determination at this time that the thread process starts suggests that the process started before the operating rate measurement start time ts. In this case, the measurement of the operation time starts from the time ts during the thread process.

When it is determined that the thread process starts in step S13, the process start time is read from a timer. In the example of FIG. 4, when the process of the thread A starts in the core0, the time ta1 is read from the timer. Subsequently, in the example shown in the drawing, it is determined whether the operating rate measurement unit time ends (step S15). That is, in the operating rate measurement process, the time T from the time ts to the time tf is used as the operating rate measurement process unit time. In step S15, it is determined whether this operating rate measurement unit time T ends. With respect to the end of this operating ratio measurement unit time, it can also be determined whether the measurement end instruction is issued by a controller.

When it is determined that the operating rate measurement process unit time has not ended yet in step S15, the process proceeds to step S16 and it is determined whether the thread process ends (step S16). In the example of FIG. 4, it is determined whether the thread A that started at the time ta1 ends. If it is determined that the process of the thread A does not end yet, the process returns to step S15. Then, it is determined whether the operating rate measurement unit time T ends, and the process repeats these operations.

When the thread process ends while the operating rate measurement unit time has not ended yet, the thread process end time is read from the timer (step S17). In the example of FIG. 4, the process of the thread A in the core0 ends at the time ta2, and this time ta2 is read.

Subsequently, the operating time is calculated from both the thread process start time ta1 read from the timer in step S14 and the thread process end time ta2 read from the timer in step S17, and the calculated value is stored (step S18). In this process, the process time of the thread A, namely, the operating time T1 of the thread A in the core0, can be calculated from the difference (ta2−ta1). Thereafter, it is again determined whether the operating rate measurement unit time ends (step S19). If the time has not ended, the process returns to step S12. As before, the process waits for a start of the next thread process in this core and repeats the same operations.

In the course of this process, when it is determined that the operating rate measurement unit time ends in step S15, the process proceeds to step S22, and the time at which the operating rate measurement unit time ends is read from the timer.

In the example of FIG. 4, the process of the thread B is performed after the process of the thread A. The process of this thread B starts at the time tb1 and ends at the time tb2. In the process, the operating time T2 is found from the difference (tb2−tb1) as described above. Further, in the core0, the process of the thread C is also performed during the operating rate measurement unit time T. In the thread C, the process starts at the time tc1 and ends at the time tc2. As a result, the operating time T3 of the thread C is found from the difference (tc2−tc1). These processes can also be performed by repeating the process from steps S13 to S19 of FIG. 2.

In the course of this process, a determination that a new thread process starts in step S13 and that the operating rate measurement unit time ends in step S15 suggests the time T ends during the thread process. In this case, the process proceeds to step S22 and the end time of the operating rate measurement unit time is read from the timer. Note, however, that since the end time tf of the operating rate measurement unit time is previously set, the operating rate measurement unit end time may be obtained simply by reading the set value.

Subsequently, in this thread process, from both the thread process start time and the end time of the operating rate measurement unit time, the operating time is calculated and stored in the same manner as above. In steps S18 and S19, when the thread process is not being performed and the operating rate measurement unit time ends, the process in steps S22 and S23 is performed and the operating time for each thread in the operating rate measurement unit time is summed (step S20). When it is determined that the operating rate measurement unit time ends in step S19, the summation is performed in the above-described step S20. At the same time, in step S11, it is determined whether the next operating rate measurement unit time starts. Since the operating rate measurement unit time is continuous in many cases, the process proceeds to step S13 from step S11 immediately after step S19 at this time and the operation is repeated.

When the operating time for each thread in the operating rate measurement unit time is summed, the summation (T1+T2+T3) of T1 of the thread A, T2 of the thread B, and T3 of the thread C is performed in the core0 in the example of FIG. 4. Only T4 of the thread D exists in the core1, and the sum (T5+T6) of T5 of the thread E and T6 of the thread F is calculated in the core 2. In the same manner, the summation (T7+T8) of T7 of the thread G and T8 of the thread H is performed in the core 3.

Subsequently, the operating rate in the operating rate measurement unit time is calculated in step S21 and the calculated value is outputted (step S24). In this process, in the core0, the formula [η0=(T1+T2+T3)/T×100] is calculated with respect to the operating rate rq0 as shown in FIG. 4. In the core1, the formula [η1=T4/T×100] is calculated with respect to the operating rate η1. In the core2, the formula [η2=(T5+T6)/T×100] is calculated with respect to the operating rate η2. In the core3, the formula [η3=(T7+T8)/T×100] is calculated with respect to the operating rate η3.

The operating rate for each core as basic data of the microprocessor control method according to the present embodiment can be found by the above-described process. As a result, the operating core selection control process for control of the multicore processor according to the present embodiment can be performed as shown in FIG. 3. In the example of the operating core selection control process shown in FIG. 3, the operating rate calculation process for each core is first performed as shown in FIG. 2 (step S31). That is, after the end of the operating rate measurement unit time, the operating rate calculation process for each core is performed. Then, the operating rate calculated value for each core is tabulated to calculate the total operating rate (step S32).

The total operating rate is the summation of the operating rate η0 of the core0, the operating rate η1 of the core1, the operating rate η2 of the core2, and the operating rate η3 of the core3. As described in FIG. 4, the overall operating rate η is found by performing the summation (η0+η1+η2+η3). Accordingly, for example, when all the cores operate throughout the operating rate measurement unit time T, the value η=400 is obtained. If none of the cores operate, the value η=0 is obtained. Note, however, that at least specific cores perform the control process according to the present invention, but the calculation processing amount is extremely slight.

Thereafter, in this embodiment, using the number of cores operating immediately before the start of the operating rate measurement unit time, namely, the number of cores operating immediately before the operation time and the overall operating rate calculated above, the number of operating cores is read out from a table (step S33). Various types of table may be used at this time. For example, the operating core number and core startup/shutdown timing table as shown in FIG. 5 can be used.

In the operating core number and core startup/shutdown timing table shown in FIG. 5, when the overall operating rate η is 0 to 40%, the number of operating cores is set to 1. As is seen from the Figure, only the core0 is selected. Now assume the case where the overall operating rate increases from this state continuously. When the overall operating rate η exceeds 80%, the number of operating cores is set to 2. In the example shown in the Figure, the core1 starts. Subsequently, when the overall operating rate η exceeds 160%, the number of operating cores is set to 3 and the core2 also starts. Further, when the overall operating rate η exceeds 240%, the number of operating cores is set to 4 and the core3 starts. That is, when the overall operating rate exceeds 240%, all of the four cores operate together for the first time.

As a result, when the number of operating cores is set in each range of the overall operating rate, the number of operating cores can be operated corresponding to the overall processing amount. Therefore, power consumption of this multicore processor can be reduced. Moreover, a core to be shut down can be advantageously adjusted in accordance with the overall operating rate of the processor, different from the conventional technology wherein a core with a low operating rate is shut down. Therefore, the optimum number of operating cores can be controlled in the processor.

When the overall operating rate increases, the operating cores are controlled as described above. Now, assume that the overall operating rate continuously decreases from a state where the overall operating rate is 400% and the number of operating cores is four. When the overall operating rate decreases to less than 160%, the number of operating cores is set to three and the operation of the core3 is shut down. As described above, in the example of the table of FIG. 5, when the operating rate increases to 240% in startup, the number of the operating cores is set to four; but once started up, until the operating rate decreases to 160%, the four cores operate. An operation with such a hysteresis characteristic is performed also in the control of the number of cores in the other operating rates as described below.

When the overall operating rate further decreases from 160% to 80%, the number of operating cores is set to two and the core2 shuts down in the example shown in the drawing. Further, when the overall operating rate decreases to 40%, the number of operating cores is set to one. After the core1 shuts down, the process is performed only by the core0. The number of operating cores is set with such a hysteresis characteristic in which the number of operating cores is different between increasing and decreasing times of the overall operating rate. Therefore, even with frequent change of the overall operating rate, frequent starting up and shutting down of the core can be prevented.

Accordingly, when the overall operating rate increases/decreases in the following order, for example: (1) 10%, (2) 70%, (3) 90%, (4) 45%, (5) 200%, (6) 150%, (7) 300%, (8) 70%, the number of operating cores is set to one and only the core0 operates at (1) 10%; the number of operating cores still is set to one and only the core0 operates at subsequent (2) 70%; the number of operating cores is set to two and both the core0 and the core1 operate at (3) 90%; the number of operating cores still is set to two and the core0 and the core1 operate also at subsequent (4) 45%; the number of operating cores is set to three and the core0, the core1 and the core2 operate at subsequent (5) 200%; the number of operating cores still is three and accordingly, the core0, the core1 and the core2 operate at subsequent (6) 150%; the number of operating cores is set to four and the core3 additionally operates so that all the cores operate at subsequent (7) 300%; and the number of operating cores is set to two, the core4 and the core3 are shut down, and the core0 and the core1 operate at subsequent (8) 70%.

Even at the same 70% of overall operating rate, for example, when the rate increases from (1) 10% to (2) 70%, only the core0 operates, whereas when the rate decreases from (7) 300% to (8) 70%, both the core0 and the core1 operate. In the same manner, at the 45% overall operating rate that is lower than 70%, the core0 and the core1 continue operation as when the rate decreases from 90% to 45%. As described above, a table is prepared in which the operating cores are determined based not only on temporal data of the operating rate but also a relationship with the previous overall operating rate.

After the number of operating cores is thus read based on both the adjacent number of operating cores and the calculated overall operating rate in step S33 of FIG. 3, the operating core number is selected and then stored (step S34). Specifically, in the example of the table in FIG. 5 the core0 is used as the basic core and the core1 is always added to the core0 when the overall operating rate requires two cores, the core2 always starts when the overall operating rate requires three cores, and the core3 operates only when the overall operating rate requires all the cores. The number of operating cores is thus set corresponding to the overall operating rate, but the operating cores may be operated in accordance with another method different from the above-described example.

The selection of specific cores corresponding to the overall operating rate previously set may be performed in various modes such as an order of the cores 0, 2, 3 and 1, or 0, 3, 1 and 2 in addition to the order of the cores 0, 1, 2 and 3, for example. In the present embodiment as shown in FIG. 1, the software for performing the process is incorporated into the core0 and, therefore, this core always operates as the basic core. Accordingly, if this software is incorporated into the core1 to perform the process, the core1 always operates as the basic core.

In the above-described example, the order of the cores may be previously set so as to be changed to various modes on demand. For example, cores may first operate in conformity to the overall operating rate in the order of the cores 0, 1, 2 and 3; and when only the basic core0 operates in a subsequent thread process, the order of the cores may be changed to 0, 2, 3 and 1; 0, 2, 1 and 3; 0, 3, 1 and 2; 0, 3, 2 and 1; or 0, 1, 3 and 2. At that time, when the core0 is used as the basic core, uniformity of a processing load can be realized by controlling the operations of the other cores to be uniform as much as possible. Note that cores other than the basic core may be randomly changed.

In FIG. 3, the above-described operating core is selected in step S34 and the selected cores are stored. At this time, the number of cores may be selectively stored. In the example shown in the Figure, it is determined whether an exceptional process is generated. Specifically, in the course of a series of thread processes of the processor, when the urgent necessity of a large-volume process occurs such as the urgent interruption of a large-volume data process, an exceptional process is detected in step S35. On this occasion, the operating process can be immediately performed by all the cores (step S36).

Various states can be previously set as exceptional processes. For example, when it is detected that the multicore processor control is not appropriately performed, the exceptional process may be used to cancel the above-described core selection process. When the operating process of all the cores is performed, for example, because of urgent interruption of a large-volume data process in step S36, it is determined whether a predetermined time passes (step S37). Until a predetermined time passes, the process returns to step S36 and regularly repeats the operation, whereas when a predetermined time elapses, the process returns to step S31 and repeats the operation. When an exceptional process is not detected in step S35, a thread obtained by dividing one task into a plurality of parts is allocated to the cores selected in step S34 by the thread scheduler 1 of FIG. 1 (step S38). The process returns to step S31 and repeats the same operation.

In the above-described example, the threads obtained by dividing one task into a plurality of parts are allocated to each core of the multicore processor by the thread scheduler and processed. One relatively large task may also be divided into a plurality of tasks, and each task is allocated to an arbitrary core by a task scheduler and processed according to the method. On this occasion, the thread scheduler of FIG. 1 is used as the task scheduler. On the task list 2, for example, a core0 task, core1 task, core2 task and core3 task obtained by dividing the first task into a plurality of parts are allocated to each core.

In the above-described example, an operating rate of each core is calculated by finding and then summing an operating time of each thread processed within a predetermined time. Alternatively, the multiprocessor may be controlled by finding the number of threads or tasks processed within a predetermined time and then using the number as an operating rate of each core. As a result, the calculation process of an operating rate is simplified and the processing load of the basic core for performing this calculation is decreased.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A method for controlling a multicore processor to reduce power consumption when an entire calculation processing amount of the processor is less than maximum, the multicore processor having a plurality of cores each independently performing a calculation process on one processor, comprising the acts of:

operating at least one core of the multicore processor to perform tasks or threads of a calculation process allocated to the core when the entire calculation processing amount of the processor is less than maximum;

calculating an operating rate of each core within a predetermined time as an indication of how much the core is operating to perform the tasks or threads allocated to the core, and summing all of the operating rates to calculate an overall operating rate of cores;

determining a number of operating cores corresponding to the overall operating rate; and selecting a number of cores to be operated based on the determined number of cores and on whether the overall operating rate is increasing or decreasing in accordance with a hysteresis characteristic, such that for at least one overall operating rate, the selected number of cores is different depending on whether the overall operating rate is increasing or decreasing.

2. The method according to claim 1, wherein:
a calculation of the operating rate of each core is performed on a thread or task performed in each core.

3. The method according to claim 1, wherein:
each of the process of calculating the operating rates of each core and of all the cores, the process of determining the number of operating cores, and the process of selecting the operating cores is performed in a specified core among the plurality of cores.

4. The method according to claim 1, wherein:
in selecting a plurality of cores, predetermined specific cores corresponding to the overall operating rate are selected.

5. The method according to claim 1, wherein:
in selecting a plurality of cores, specified cores are changed in accordance with a predetermined mode corresponding to the overall operating rate.

6. The method according to claim 1, wherein:
in selecting the operating cores, specified cores are randomly selected.

7. The method according to claim 1, wherein:
in selecting the operating cores, when an exceptional process is detected, all the cores are selected.

8. The method according to claim 7, wherein:
after selecting all the cores, when it is determined that the exceptional process is eliminated after an elapse of a predetermined time, the selection process of the cores is resumed.

9. The method according to claim 7, wherein:
the exceptional process is detected when it is determined that the operation according to the calculating, determining and selecting acts is not appropriately performed.

10. The method according to claim 1, wherein:
the operating rate of each core is a rate of an operating time within a predetermined time; and
the operating time of each core is summed to calculate the overall operating rate of the cores.

11. The method according to claim 1, wherein:
the operating rate of each core is a rate of the number of operating times within a predetermined time; and
the number of operating times of each core is summed to calculate the overall operating rate of the cores.

12. A device for controlling a multicore processor to reduce power consumption when an entire calculation processing amount of the processor is less than maximum, the multicore processor having a plurality of cores each independently performing a calculation process on one processor, comprising:

a core operating rate calculating section for calculating an operating rate of each core within a predetermined time, while at least one core of the multicore processor is operating to perform tasks or threads of a calculation process allocated to the core when the entire calculation processing amount of the processor is less than maximum, as an indication of how much the core is operating to perform the tasks or threads allocated to the core;

an overall operating rate calculating section for summing the operating rate of each core calculated by the core operating rate calculating section to calculate an operating rate of the entire processor;

an operating core number storing section for storing in association the overall operating rate of the processor and the number of operating cores;

an operating core number determining section for determining a number of operating cores based on the overall operating rate of the processor in the operating core number storing section; and an operating core selecting section for selecting a number of cores to be operated based on the number of cores determined by the operating core number determining section and on whether the overall operating rate is increasing or decreasing in accordance with a hysteresis characteristic, such that for at least one overall operating rate, the selected number of cores is different depending on whether the overall operating rate is increasing or decreasing.

13. The device according to claim 12, wherein:
the core operating rate calculating section calculates a core operating rate of each core based on an operating time within a predetermined time; and
the overall operating rate calculating section sums the operating time of each core to calculate the overall operating rate.

14. The device according to claim 12, wherein:
the core operating rate calculating section sums the number of operating times within a predetermined time to calculate the overall operating rate; and
the overall operating rate calculating section sums the number of operating times of each core to calculate the overall operating rate.

15. The device according to claim 12, wherein:
the core operating rate calculating section performs a calculation of the operating rate on a thread or task performed in each core.

16. The device according to claim 12, wherein:
the calculating section, the storing section, the determining section, and the selecting section are provided on a specified core among the plurality of cores.

17. The device according to claim 12, wherein:
the operating core selecting section selects a predetermined specified core corresponding to the overall operating rate.

18. The device according to claim 12, further comprising:
an exceptional process generation detecting section for detecting the generation of an exceptional process in the multicore processor, wherein:
when the exceptional process generation detecting section detects the generation of the exceptional process, the operating core number determining section determines the operation of all the cores.

* * * * *